G. L. HAUSSKNECHT.
RUNNING GEAR OF CARRIAGES, &c.
No. 8,588. Patented Dec. 16, 1851.
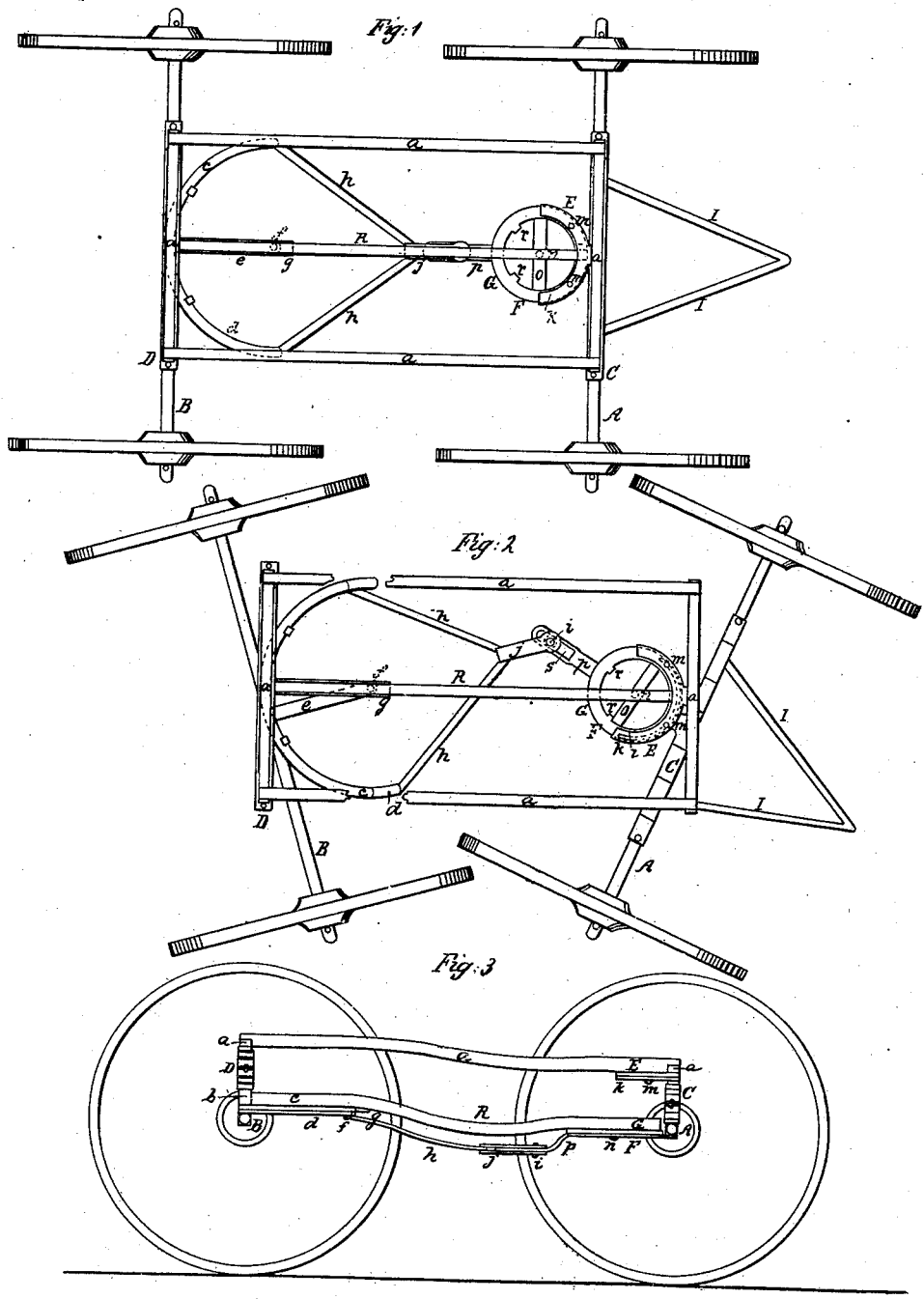

UNITED STATES PATENT OFFICE.

GUSTAVUS L. HAUSSKNECHT, OF NEW HAVEN, CONNECTICUT.

CARRIAGE.

Specification of Letters Patent No. 8,588, dated December 16, 1851.

*To all whom it may concern:*

Be it known that I, GUSTAVUS L. HAUSSKNECHT, of the city and county of New Haven and State of Connecticut, have invented certain new and useful Improvements in the Running-Gear of Carriages or other Vehicles; and I do hereby declare that the following is a full, clear, and exact description of the same, reference being had to the accompanying drawings, forming part of this specification, in which—

Figure 1, is a plan, showing the running gear in its position when pursuing a straight course. Fig. 2, is a plan showing the same when traveling in a curve, and Fig. 3, is a side elevation with the wheels on one side removed.

The same letters of reference denote similar parts in each of the several figures.

To enable others skilled in the art to make and use my invention, I will proceed minutely to describe it.

$a, a, a, a$, is the carrying frame of a four wheeled vehicle. A, the front and B, the hand axles on the ends of which the running wheels revolve.

C, is the front and D, the hind elliptic spring the upper half of the hind spring is firmly secured at its center to the back cross piece $a$, of the carrying frame and its lower half to a short block $b$, attached to the back end of the perch and the under side of which is secured to a traversing segment $c$, which moves over or upon an under segment $d$, secured to the hind axle and connected through arm $e$, by pivot pin $f$, to a similar arm $g$, projecting from the upper segment C, and made fast to the perch.

R, is the perch connected to the back spring of the carrying frame, but not attached at its other end to the front spring axle or frame.

$h, h$, are braces connecting the ends of the segment $d$, to an horizontal arm $j$, which is made with a slot in direction of its length and carries a guide roller or projection within the slot working on or attached to a pin $i$. The front spring C, is secured on its bottom half at the center to the front axle A, and at its top to a traversing segment $k$, which has a curved groove $l$, through it, in which pins $m, m$, attached to an upper segment E, move the segment E, being secured to the front cross piece $a$, of the carrying frame.

F, is an under traversing ring or "fifth wheel" made fast to the under side of the front axle and traveling on a pivot $n$, which passes through a cross piece $o$, of the fifth wheel F, and is welded fast to a cross brace of an upper fifth wheel G, secured to the perch, the upper wheel G, having stops $r, r$, that the cross brace $o$, of the under wheel strike against when the running wheels have been turned as far as safety or the sides of the carriage will permit.

$p$, is an arm fast to the under fifth wheel F, and which is made with a groove $s$, in it, the grooved part of the arm $p$, traversing in the slot of the arm $j$, and the roller or projection on the pin $i$, running in the groove $s$.

I, I, are braces secured to the front axle and to which the draft pole is attached.

The operation of the several parts in the running gear constructed, connected and working together in the manner described, will be more readily seen by reference to Fig. 2, where the vehicle in describing a curve causes the running gear to operate as is there seen, the lower segment $d$, traversing with the hind axle through the arm $e$, from the pivot $f$, the segments $c$, and $d$, being in contact and so linked or coupled together as to admit of them working one against the other, while the fifth wheels F and G, (or segments corresponding thereto) work with their faces one against the other from the pivot or through the motion of the front axle by the turning of the vehicle, the arms $j$, and $p$, constructed and operating together as described, and causing, by the roller or projection from the pin $i$, (working in the groove $s$) the front and hind axles or their running wheels to turn in the suitable directions smoothly and simultaneously, the segments $k$ and E, constructed and operating one against the other as described and further serving to steady and strengthen the running gear which thus constructed and arranged allows of larger fore wheels being used than is generally admissible also of the vehicle describing a quicker curve or smaller circle with perfect safety and without the fore and aft wheels interfering with one another or rubbing the sides of the carriage. Various modifications of these parts may be made or will be necessary according to the description of carriages or vehicles they are required to be attached to.

I am aware that carriages with two moving axles have been constructed, the turning points being in the center of both axles, and the movements of the same coupled by two diagonal bars joining on their ends to the axle, so that the direct line between two joints will cross the turning point of either axle; such carriages will require a larger space to be turned in than my mode of construction. By means of my improvements, and use of the coupling as shown, either turning point as described, placed in rear of the front axle and in front of the hind axle, may be used separately of itself if desirable, that is, the one turning point being positioned similarly as shown in the drawing while the other turning point is in a center line under the axle. In all cases the movements of the two axles should be coupled as follows. Bring the fore wheel in the right position to the body of the carriage and position the hind wheel near the fore one on the turning side, without interfering. Draw intersecting lines from a point on either axle in the center of their length and the point of intersection will give the proper position for the pin $i$, of the connecting coupling.

What I do claim as my invention and desire to secure by Letters Patent is—

The employment of segments $c$, $d$, and fifth wheels F, G, (or parts corresponding thereto) attached as described, the one segment $d$ and fifth wheel F working on pivots $f$, $n$, secured at points between the front and hind axle, such parts acting in combination with arms $j$, $p$, constructed substantially as shown and described for coupling the movements of two axles or their turning appurtenances, for the purposes set forth.

GUSTAVUS L. HAUSSKNECHT.

Witnesses:
S. H. WALES,
O. D. MUNN.